(12) United States Patent
Osagawa et al.

(10) Patent No.: US 10,343,578 B2
(45) Date of Patent: Jul. 9, 2019

(54) CONTROL SYSTEM FOR DUMP TRUCK, DUMP TRUCK, AND CONTROL METHOD FOR DUMP TRUCK

(71) Applicant: Komatsu Ltd., Tokyo (JP)

(72) Inventors: Kenta Osagawa, Tokyo (JP); Koji Takeda, Tokyo (JP)

(73) Assignee: Komatsu Ltd., Tokyo (JP)

( * ) Notice: Subject to any disclaimer, the term of this patent is extended or adjusted under 35 U.S.C. 154(b) by 14 days.

(21) Appl. No.: 15/579,323

(22) PCT Filed: Mar. 31, 2017

(86) PCT No.: PCT/JP2017/013858
§ 371 (c)(1),
(2) Date: Dec. 4, 2017

(87) PCT Pub. No.: WO2017/171088
PCT Pub. Date: Oct. 5, 2017

(65) Prior Publication Data
US 2018/0281656 A1    Oct. 4, 2018

(51) Int. Cl.
*B60P 1/16* (2006.01)
*F15B 11/04* (2006.01)
(Continued)

(52) U.S. Cl.
CPC .............. *B60P 1/162* (2013.01); *B60P 1/16* (2013.01); *F15B 11/04* (2013.01); *F15B 15/22* (2013.01); *G05D 3/12* (2013.01); *G05D 13/34* (2013.01)

(58) Field of Classification Search
CPC .. B60P 1/162; B60P 1/16; B60P 1/283; B60P 1/045; B60P 1/006; B60P 1/28;
(Continued)

(56) References Cited

U.S. PATENT DOCUMENTS 4,382,632 A * 5/1983 Pitts ...................... B60G 17/005
298/17 S
5,020,857 A * 6/1991 Bertelson ................ B60P 1/162
298/22 C
(Continued)

FOREIGN PATENT DOCUMENTS

JP      2002-089508 A    3/2002
JP      2006-347502 A   12/2006
(Continued)

OTHER PUBLICATIONS

International Search Report dated Jun. 20, 2017, issued for PCT/JP2017/013858.
(Continued)

*Primary Examiner* — D Glenn Dayoan
*Assistant Examiner* — Sunsurraye Westbrook
(74) *Attorney, Agent, or Firm* — Locke Lord LLP

(57) ABSTRACT

A control system for a dump truck includes a signal reception unit that receives a rising command signal to cause the dump truck including a vessel and a hydraulic cylinder configured to raise and lower the vessel to start a rising action of the vessel, and a vessel control unit that varies an extension speed of the hydraulic cylinder nonlinearly with respect to elapsed time when the signal reception unit receives the rising command signal.

9 Claims, 10 Drawing Sheets

(51) Int. Cl.
*F15B 15/22* (2006.01)
*G05D 3/12* (2006.01)
*G05D 13/34* (2006.01)

(58) Field of Classification Search
CPC ........... B60P 1/6454; B60P 1/04; B60P 1/027; B60P 1/20; B60P 1/34; B60P 1/14; F15B 11/042; F15B 11/044; F15B 2211/3116; F15B 2211/351; F15B 2211/353; F15B 2211/6313; F15B 2211/6336; F15B 2211/665; F15B 2211/7107
USPC ........ 298/22 C, 22 R, 22 P, 11, 14, 18, 17 S, 298/35 M, 35 R, 38; 414/408, 477, 501, 414/555, 21, 469, 730, 812, 919
See application file for complete search history.

(56) References Cited

U.S. PATENT DOCUMENTS

| | | | |
|---|---|---|---|
| 6,568,763 B2 | 5/2003 | Uematsu et al. | |
| 8,328,291 B2 | 12/2012 | Nakate et al. | |
| 8,731,787 B2 | 5/2014 | Tamura et al. | |
| 8,840,189 B2 * | 9/2014 | Minoshima | B60P 1/162 298/22 R |
| 9,145,127 B2 * | 9/2015 | Uematsu | B60T 8/175 |
| 9,550,499 B2 | 1/2017 | Sakai | |
| 9,625,919 B2 * | 4/2017 | Mochizuki | B60G 17/015 |
| 2013/0035828 A1 | 2/2013 | Tamura et al. | |
| 2014/0222303 A1 | 8/2014 | Chary et al. | |
| 2016/0031448 A1 | 2/2016 | Sakai | |
| 2016/0137116 A1 | 5/2016 | Chary et al. | |

FOREIGN PATENT DOCUMENTS

| | | |
|---|---|---|
| JP | 2013-028306 A | 2/2013 |
| WO | 2015/033708 A1 | 3/2015 |
| WO | 2016/142194 A1 | 9/2016 |

OTHER PUBLICATIONS

Office Action dated Feb. 12, 2018, issued for Australian patent application No. 2017241972.
Office Action dated on Aug. 2, 2018 issued for corresponding Canadian Patent Application No. 2,990,944.

* cited by examiner

CONTROL SYSTEM FOR DUMP TRUCK, DUMP TRUCK, AND CONTROL METHOD FOR DUMP TRUCK

FIELD

The present invention relates to a control system for a dump truck, a dump truck, and a control method for a dump truck.

BACKGROUND

Work vehicles such as dump trucks include vessels for carrying cargoes. For example, during dumping work and the like, a hoist cylinder is extended to raise the vessel and discharge the cargo to a dumping site.

CITATION LIST

Patent Literature

Patent Literature 1: JP 2002-89508 A

SUMMARY

Technical Problem

In the dumping work, it is required to adjust a discharge amount according to the capacity of the dumping site, a processing situation of the discharged cargo, and so on. For this reason, an operator, for example, stops the rise of the vessel halfway to perform an operation of suppressing the discharge amount of the cargo. If an operation timing for the vessel is not appropriate, there is a possibility of the productivity at a work site decreasing.

An object of a mode of the present invention is to suppress a decrease in productivity at a work site.

Solution to Problem

According to a first embodiment of the present invention, a control system for a dump truck comprises: a signal reception unit that receives a rising command signal to cause the dump truck including a vessel and a hydraulic cylinder configured to raise and lower the vessel to start a rising action of the vessel; and a vessel control unit that varies an extension speed of the hydraulic cylinder nonlinearly with respect to elapsed time when the signal reception unit receives the rising command signal.

Advantageous Effects of Invention

According to a mode of the present invention, a decrease in productivity at a work site can be suppressed.

DESCRIPTION OF EMBODIMENTS

Hereinafter, embodiments according to the present invention will be described with reference to the drawings, but the present invention is not limited thereto. Constituent elements of the embodiments described below can be appropriately combined. In addition, some constituent elements are not used in some cases.

[Management System]

Figure 1:
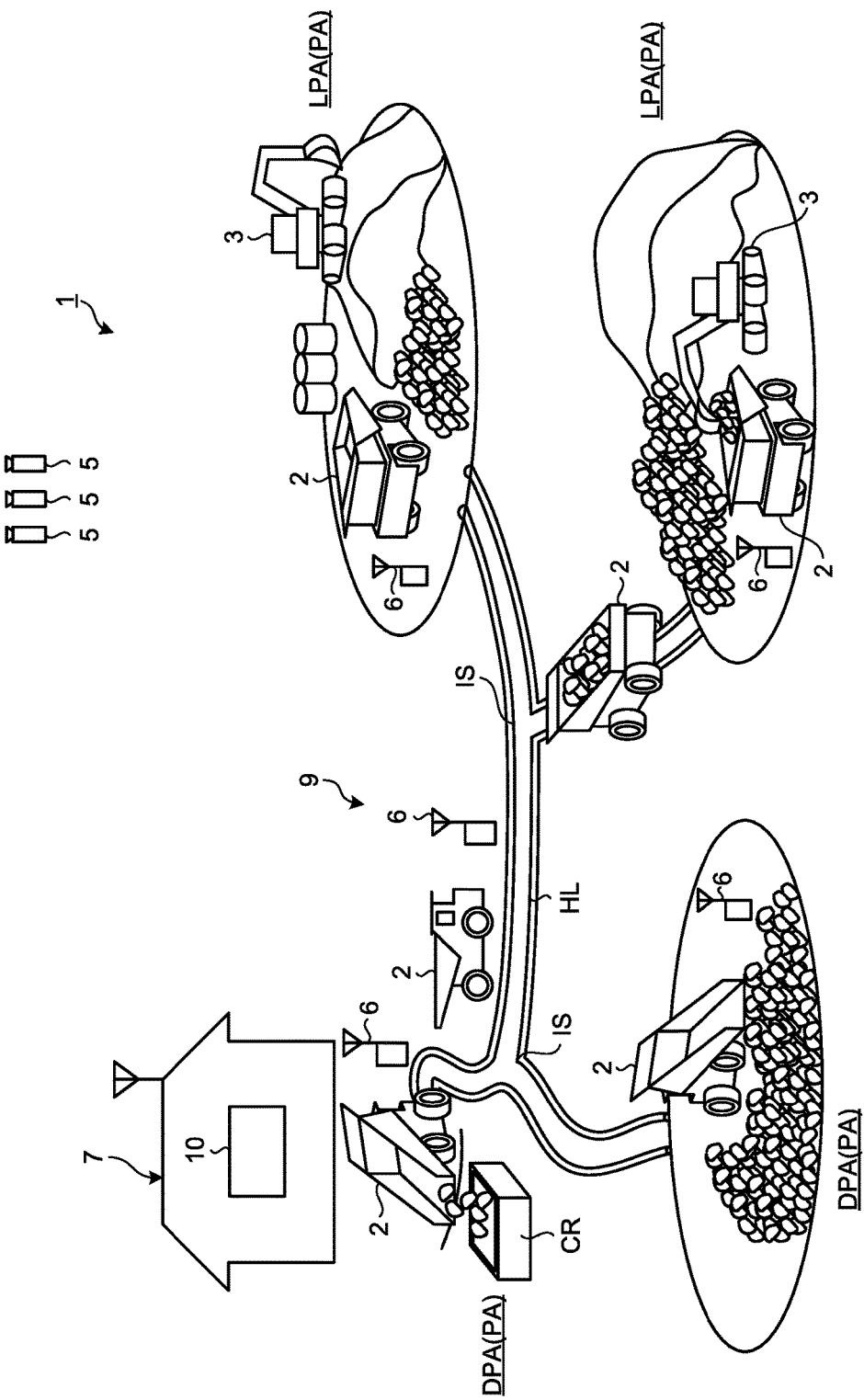
FIG. 1 is a diagram schematically illustrating an example of a management system for a dump truck according to the present embodiments.

A management system 1 for a work vehicle 2 according to the present embodiment will be described. FIG. 1 is a diagram schematically illustrating an example of the management system 1 for the work vehicle 2 according to the present embodiment. The management system 1 carries out operation management of the work vehicle 2. In the present embodiment, the work vehicle 2 is a dump truck 2 which is a transport vehicle capable of traveling through a mine.

As illustrated in FIG. 1, the dump truck 2 travels through a workplace PA in a mine and at least a part of a conveying path HL leading to the workplace PA. The workplace PA includes at least one of a loading ground LPA and a dumping site DPA. The conveying path HL includes an intersection IS. The dump truck 2 travels in accordance with course data set for the conveying path HL and the workplace PA.

The loading ground LPA is an area where loading work for loading a cargo on the dump truck 2 is carried out. A loading machine 3 such as an excavator serves at the loading ground LPA. The dumping site DPA is an area where discharge work for discharging the cargo from the dump truck 2 is carried out. For example, a crusher CR is provided in the dumping site DPA. The crusher CR includes a control device 50, a wireless communication device 54, an input device 55, and a display device 56 as described later (refer to FIG. 4).

The management system 1 includes a management device 10 and a communication system 9. The management device 10 includes a computer system and is installed in a control facility 7 provided in a mine. The communication system 9 carries out data communication and signal communication between the management device 10 and the dump truck 2. The communication system 9 has a plurality of repeaters 6 that relay data and signals. The management device 10 and the dump truck 2 wirelessly communicate via the communication system 9.

In the present embodiment, the dump truck 2 is an unmanned dump truck which travels unattended without any operation by a driver. The dump truck 2 travels through a mine based on a command signal from the management device 10.

In the present embodiment, the position of the dump truck 2 is detected using a global navigation satellite system (GNSS). The global navigation satellite system includes a global positioning system (GPS). The GNSS has a plurality of positioning satellites 5. The GNSS detects a position defined by coordinate data constituted by latitude, longitude, and altitude. The position detected by the GNSS is an absolute position defined in a global coordinate system. The absolute position of the dump truck 2 at the mine is detected by the GNSS.

[Dump Truck]

Figure 2:
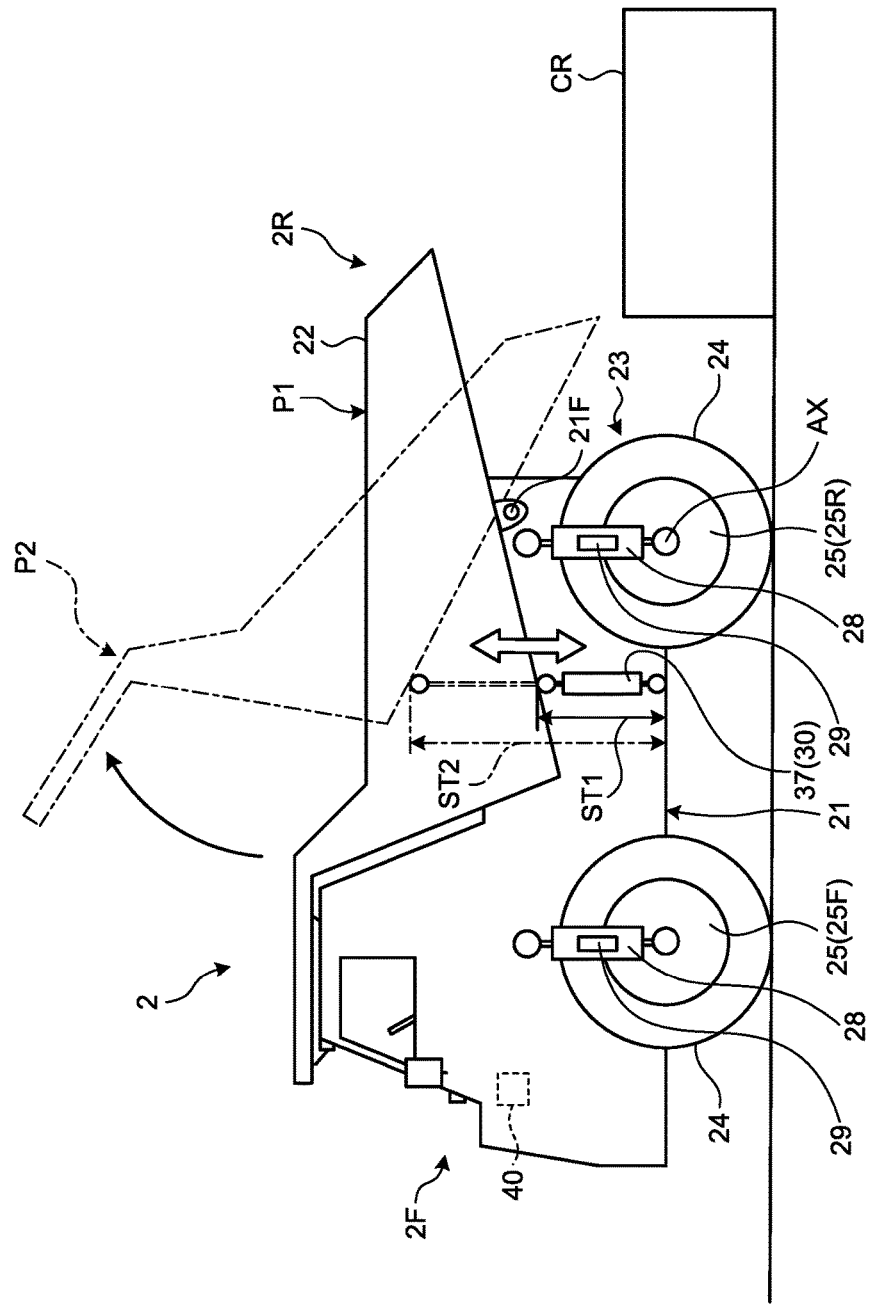
FIG. 2 is a side view of a dump truck according to the present embodiments.

Next, the dump truck 2 according to the present embodiment will be described. FIG. 2 is a side view of the dump truck 2 according to the present embodiment. As illustrated in FIG. 2, the dump truck 2 includes a vehicle body frame 21, a vessel 22 supported by the vehicle body frame 21, a traveling device 23 that travels while supporting the vehicle body frame 21, and a control device 40.

The traveling device 23 has wheels 25, on each of which a tire 24 is mounted. The wheels 25 include a front wheel 25F and a rear wheel 25R. The front wheel 25F is steered by a steering device 33 (refer to FIG. 4). The rear wheel 25R is not steered. The wheel 25 rotates about a rotation shaft AX.

The vehicle body frame 21 supports a driving device 31 (refer to FIG. 4) that produces a driving force for driving the traveling device 23. The vessel 22 is a member on which a cargo is placed. A rising action and a lowering action of the vessel 22 are performed by a vessel rising and lowering driving device 30 (refer to FIG. 4).

Figure 3:
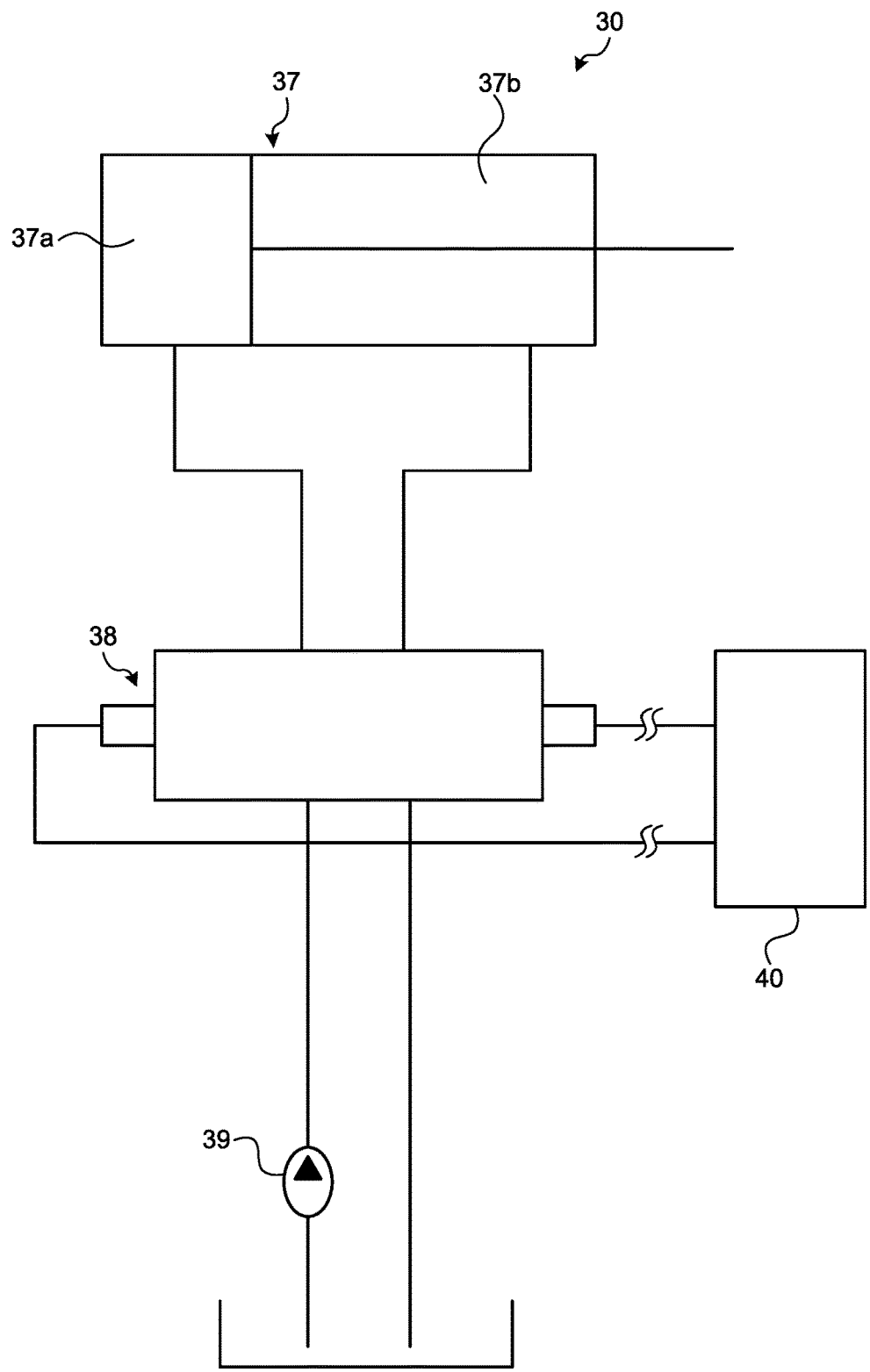
FIG. 3 is a diagram schematically illustrating an example of a vessel driving device according to the present embodiments.

FIG. 3 is a diagram schematically illustrating an example of the vessel driving device 30 according to the present embodiment. As illustrated in FIG. 3, the vessel rising and lowering driving device 30 includes, for example, a hoist cylinder (hydraulic cylinder) 37, a hoist valve 38, and a hydraulic pump 39.

The hydraulic pump 39 is driven by an internal combustion engine of the driving device 31 (refer to FIG. 4) and supplies pressure oil to the hoist valve 38. The hoist valve 38 switches an extension chamber 37a and a contraction chamber 37b of the hoist cylinder 37 to supply the pressure oil from the hydraulic pump 39 thereto according to a command from the control device 40. An opening area of the hoist valve 38 can be also adjusted by a command from the control device 40. By adjusting the opening area of the hoist valve 38, the flow rate of the pressure oil to the hoist cylinder 37 is adjusted and the extension/contraction speed of a cylinder of the hoist cylinder 37 is adjusted. Note that the control device 40 may control a solenoid proportional valve that controls pilot pressure of the hoist valve 38 so as to adjust the hoist valve 38 using the pilot pressure.

The hoist cylinder 37 extends when the pressure oil is supplied to the extension chamber 37a and contracts when the pressure oil is supplied to the contraction chamber 37b. The vessel 22 rocks up and down about a support point 21F (refer to FIG. 2) of the vehicle body frame 21 because of the extension and contraction of the hoist cylinder 37. For example, when the hoist cylinder 37 extends, the vessel 22 moves upward about the support point 21F. Meanwhile, when the hoist cylinder 37 contracts, the vessel 22 moves downward about the support point 21F.

Additionally, a suspension cylinder 28 is disposed between the wheel 25 and the vehicle body frame 21. Hydraulic oil is sealed inside the suspension cylinder 28. The suspension cylinder 28 extends and contracts according to the weight of the cargo. A load according to the mass of the vehicle body frame 21 and the vessel 22 (including the cargo) acts on the wheel 25 via the suspension cylinder 28.

A pressure sensor (weight detection unit) 29 detects a load acting on the suspension cylinder 28. The pressure sensor 29 is provided in the suspension cylinder 28. The pressure sensor 29 detects the pressure of the hydraulic oil in the suspension cylinder 28 to detect the weight of the cargo (carried amount). The pressure sensor 29 detects the weight of a load acting on the wheel 25. The pressure sensor 29 transmits a detection result to the control device 40.

The control device 40 controls the dump truck 2. The control device 40 can control the dump truck 2 based on a command signal transmitted from the management device 10.

[Control System for Dump Truck]

Figure 4:
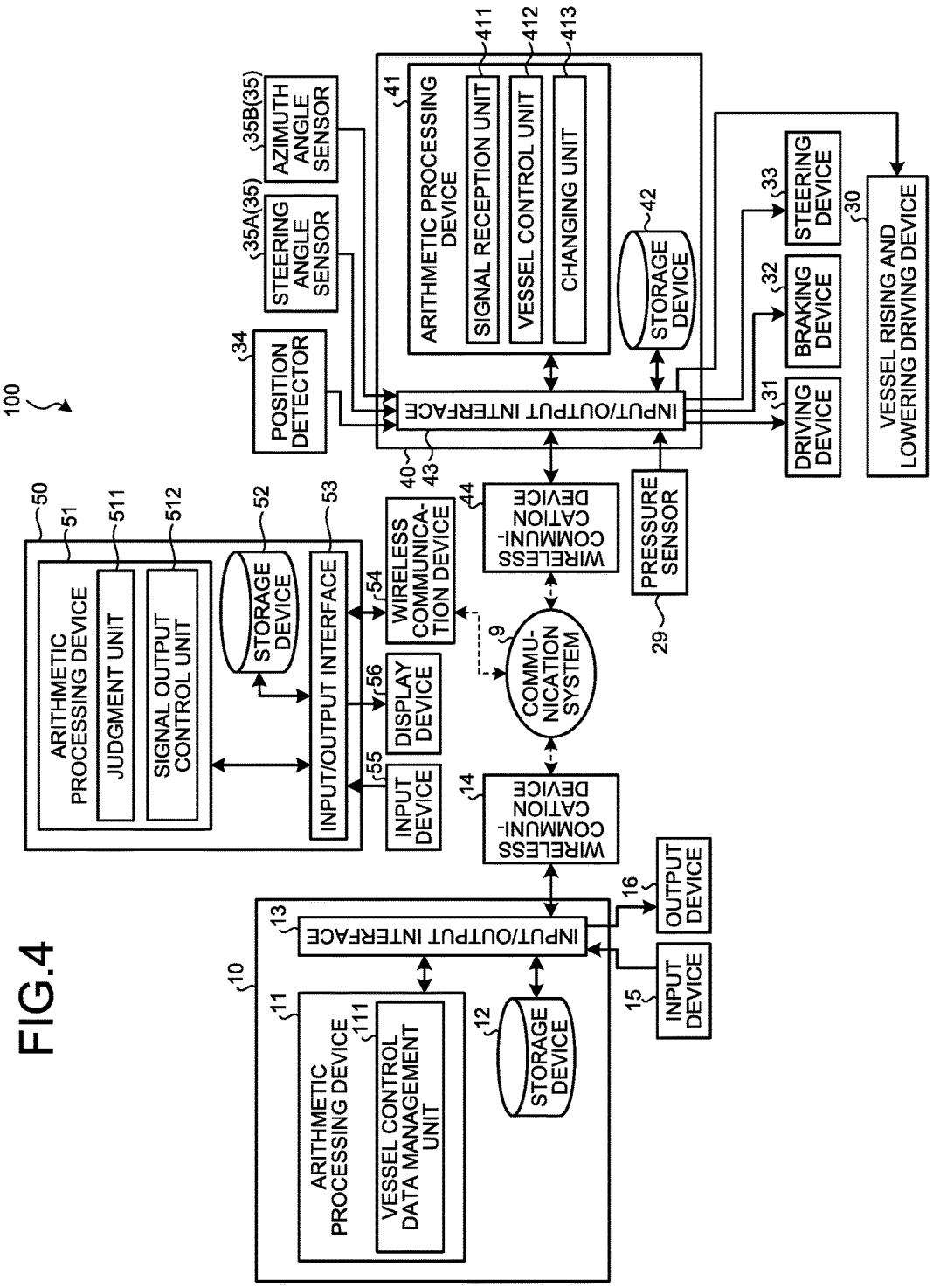
FIG. 4 is a functional block diagram illustrating an example of a management device and control devices according to the present embodiments.

Next, a control system 100 for the dump truck 2 according to the present embodiment will be described. FIG. 4 is a functional block diagram illustrating an example of the management device 10, the control device 40, and the control device 50 according to the present embodiment. The control system 100 for the work vehicle has the management device 10, the control device 40, and the control device 50. The management device 10 is installed in the control facility 7. The control device 40 is equipped in the dump truck 2. The control device 50 is installed in the crusher CR. The management device 10, the control device 40, and the control device 50 wirelessly communicate via the communication system 9.

The management device 10 includes a computer system. The management device 10 has an arithmetic processing device 11 including a processor such as a central processing unit (CPU), a storage device 12 including a memory and a storage such as a read only memory (ROM) or a random access memory (RAM), and an input/output interface 13.

The management device 10 is connected to a wireless communication device 14. The wireless communication device 14 is disposed in the control facility 7. The management device 10 communicates with the dump truck 2 via the wireless communication device 14 and the communication system 9.

The management device 10 is connected to an input device 15 and an output device 16. The input device 15 and the output device 16 are installed in the control facility 7. The input device 15 includes, for example, at least one of a keyboard, a mouse, and a touch panel for a computer. Input data generated by operating the input device 15 is output to the management device 10. The output device 16 includes a display device. The display device includes a flat panel display such as a liquid crystal display (LCD) or an organic electroluminescence display (OELD). The output device 16 functions based on display data output from the management device 10. Note that the output device 16 may be, for example, a printing device.

The arithmetic processing device 11 has a vessel control data management unit 111. The vessel control data management unit 111, for example, generates, stores, transmits and receives vessel control data. The vessel control data is data to control the rising action of the vessel 22 of the dump truck 2. That is, the vessel control data is data to control an action of expanding the hoist cylinder 37. Such vessel control data includes, for example, data to control a supply amount of the pressure oil to the hoist cylinder 37 and includes data to control the opening area of the hoist valve 38. The vessel control data is data for raising the vessel 22 by alternately performing a first mode in which the extension speed of the hoist cylinder 37 is assigned to a first speed and a second mode in which the extension speed of the hoist cylinder 37 is assigned to a second speed lower than the first speed. The vessel control data defines, for example, start and end timings of the first mode and the second mode.

The vessel control data management unit 111 stores the generated vessel control data to the storage device 12. The vessel control data management unit 111 transmits the generated vessel control data to the dump truck 2. The vessel control data management unit 111 receives the vessel control data transmitted from the dump truck 2 to store to the storage device 12.

The control device 40 includes a computer system. The control device 40 has an arithmetic processing device 41 including a processor such as a central processing unit (CPU), a storage device 42 including a memory and a storage such as a read only memory (ROM) or a random access memory (RAM), and an input/output interface 43.

The control device 40 is connected to a wireless communication device 44. The wireless communication device 44 is disposed in the dump truck 2. The control device 40 communicates with the management device 10 via the wireless communication device 44 and the communication system 9.

The control device 40 is connected to the driving device 31, a braking device 32, and the steering device 33. The control device 40 is also connected to a position detector 34 and a detection device 35. The driving device 31, the braking device 32, the steering device 33, the position detector 34, and the detection device 35 are equipped in the dump truck 2.

The driving device 31 functions to drive the traveling device 23 of the dump truck 2. The driving device 31 produces a driving force for driving the traveling device 23. The driving device 31 produces a driving force for rotating the rear wheel 25R. The driving device 31 includes, for example, an internal combustion engine such as a diesel engine. Note that the driving device 31 may include a generator that produces electric power by the function of the internal combustion engine and an electric motor that functions based on the electric power produced by the generator.

The braking device 32 functions to brake the traveling device 23. The traveling of the traveling device 23 is decelerated or stopped by the function of the braking device 32.

The steering device 33 functions to steer the traveling device 23 of the dump truck 2. The dump truck 2 is steered by the steering device 33. The steering device 33 steers the front wheel 25F.

The position detector 34 detects the absolute position of the dump truck 2. The position detector 34 includes a GPS antenna that receives a GPS signal from the positioning satellite 5 and a GPS arithmetic calculator that calculates the absolute position of the dump truck 2 based on the GPS signal received by the GPS antenna.

The detection device 35 detects a traveling direction of the dump truck 2. The detection device 35 includes a steering angle sensor 35A that detects a steering angle of the dump truck 2 by the steering device 33 and an azimuth angle sensor 35B that detects an azimuth angle of the dump truck 2. The steering angle sensor 35A includes, for example, a rotary encoder provided in the steering device 33. The azimuth angle sensor 35B includes, for example, a gyro sensor provided on the vehicle body frame 21.

The arithmetic processing device 41 has a signal reception unit 411, a vessel control unit 412, and a changing unit 413.

The signal reception unit 411 receives a rising command signal output from the crusher CR. The rising command signal is a signal to cause the dump truck 2 including the vessel 22 to start the rising action of the vessel 22.

The vessel control unit 412 controls the rising action of the vessel 22 when the signal reception unit 411 receives the rising command signal. In the present embodiment, the vessel control unit 412 acquires the vessel control data and controls the rising action of the vessel 22 based on the acquired vessel control data. In this case, the vessel control unit 412 transmits a vessel driving signal to control the rising action of the vessel 22 to the vessel rising and lowering driving device 30. The vessel control unit 412 uses a driving speed of the vessel 22, namely, alternately performs the first mode in which the extension speed of the hoist cylinder 37 is assigned to the first speed and the second mode in which the extension speed of the hoist cylinder 37 is assigned to the second speed lower than the first speed, to raise the vessel 22.

The changing unit 413 changes at least one of a timing of starting the second mode and a timing of ending the second mode based on the detection result by the pressure sensor 29.

The control device 50 includes a computer system. The control device 50 has an arithmetic processing device 51 including a processor such as a central processing unit (CPU), a storage device 52 including a memory and a storage such as a read only memory (ROM) or a random access memory (RAM), and an input/output interface 53.

The control device 50 is connected to the wireless communication device 54. The wireless communication device 54 is disposed in the crusher CR. The control device 50 communicates with the management device 10 via the wireless communication device 54 and the communication system 9.

The control device 50 is connected to the input device 55 and the display device 56. The input device 55 and the display device 56 are installed in the crusher CR. The input device 55 includes, for example, at least one of a keyboard, a mouse, and a touch panel for a computer. Input data generated by operating the input device 55 is output to the arithmetic processing device 51. The display device 56 includes a flat panel display such as a liquid crystal display (LCD) or an organic electroluminescence display (OELD).

The arithmetic processing device 51 has a judgment unit 511 and a signal output control unit 512. The judgment unit 511 judges whether a rising start instruction has been input from the input device 55 or the like. The rising start instruction is an instruction to cause the dump truck 2 that has reached a dumping position to start raising the vessel 22. An operator of the crusher CR may input the rising start instruction through the input device 55 or an operator of the management device 10 may input the rising start instruction to transmit to the arithmetic processing device 51 via the communication system 9.

The signal output control unit 512 transmits the rising command signal to the dump truck 2 when the judgment unit 511 judges that the rising start instruction has been input. The rising command signal is a signal based on the rising start instruction and is a signal for causing the dump truck 2 to start raising the vessel 22.

[Dumping Work]

Next, the dumping work according to the present embodiment will be described. As illustrated in FIG. 2, when the dumping work is performed, the dump truck 2 reaches the dumping position at the dumping site DPA. In the present embodiment, the dumping position is a position where the dumping to the crusher CR is performed.

When the dump truck 2 reaches the dumping position, the operator of the crusher CR inputs the rising start instruction through the input device 55. The judgment unit 511 of the crusher CR judges whether the rising start instruction has been input. When the judgment unit 511 judges that the rising start instruction has been input, the signal output control unit 512 transmits the rising command signal to the dump truck 2.

When the signal reception unit 411 receives the rising command signal in the dump truck 2, the vessel control unit 412 starts raising the vessel 22. The vessel control unit 412 first acquires the vessel control data. In this case, the vessel control unit 412 instructs, for example, the management device 10 to transmit the vessel control data. When the management device 10 receives this instruction, the vessel control data management unit 111 transmits the vessel control data stored in the storage device 12 to the dump truck 2. After receiving the vessel control data, the dump truck 2 controls an extending action of the hoist cylinder 37 based on the vessel control data. The hoist cylinder 37 extends from a reference length ST1 to an extension length ST2 because of this rising action (refer to FIG. 2). The reference length ST1 is, for example, a cylinder length of the hoist cylinder 37 while the vessel 22 is disposed at a reference position P1 where the vessel 22 is seated on the vehicle body frame 21. The extension length ST2 is, for example, a cylinder length of the hoist cylinder 37 while the vessel 22 is disposed at a raised position P2 set in a range in which the vessel 22 can be raised. The extension length ST2 may be an upper limit length when the vessel 22 is disposed at an upper limit position of the range in which the vessel 22 can be raised or may be a length shorter than the upper limit length.

Figure 5:
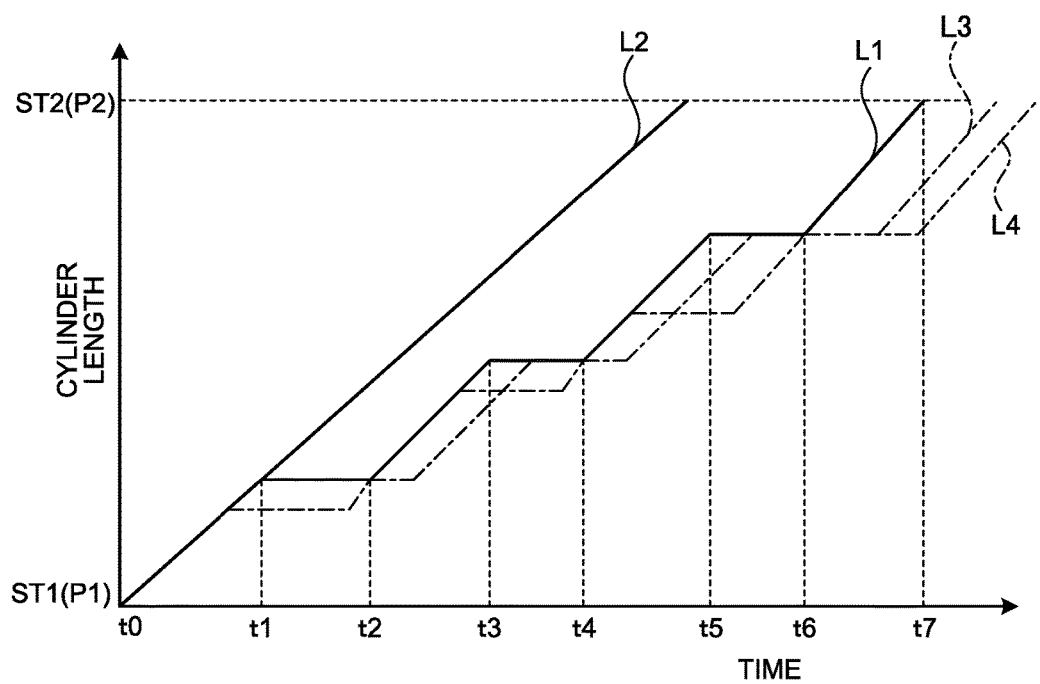
FIG. 5 is a graph illustrating an example of vessel control data according to the present embodiments.

FIG. 5 is a graph illustrating an example of the vessel control data according to the present embodiment. A vertical axis in FIG. 5 represents the cylinder length of the hoist cylinder 37, whereas a horizontal axis in FIG. 5 represents the time. As indicated by polygonal line L1 in FIG. 5, the vessel control data in the present embodiment is set such that the vessel rising and lowering driving device 30 is caused to alternately perform the first mode in which the extension speed of the hoist cylinder 37 is assigned to a first speed V1 and the second mode in which the extension speed of the hoist cylinder 37 is assigned to the second speed V2, thereby raising the vessel 22. Note that straight line L2 in FIG. 5 illustrates, as a comparative example, a case where the vessel 22 is raised with the extension speed of the hoist cylinder 37 at a constant value (for example, the first speed V1).

In the present embodiment, the vessel control unit 412 alternately repeats the first mode and the second mode in a period from a time t0 at which the extension of the hoist cylinder 37 is started up to a time t7 at which the cylinder length of the hoist cylinder 37 extends to the extension length ST2, as indicated by polygonal line L1 in FIG. 5. Specifically, a period from the time t0 to a time t1 is the first mode, a period from the time t1 to a time t2 is the second mode, a period from the time t2 to a time t3 is the first mode, a period from the time t3 to a time t4 is the second mode, a period from the time t4 to a time t5 is the first mode, a period from the time t5 to a time t6 is the second mode, and a period from the time t6 to the time t7 is the first mode. Therefore, in the present embodiment, the vessel control unit 412 alternately repeats the first mode and the second mode a plurality of times. Note that the times t1, t3, and t5 are times at which the second mode is started after the first mode is ended. Meanwhile, the times t2, t4, and t6 are times at which the first mode is started after the second mode is ended. In addition, t7 is a time at which the first mode is ended and the rising action is completed. These respective times are set in the vessel control data as timings to start and end the first mode and the second mode.

In the present embodiment, the second speed V2 in the second mode is zero. That is, the hoist cylinder 37 and the vessel 22 are maintained in a stationary state during the second mode. Therefore, in the present embodiment, the vessel control unit 412 alternately repeats the first mode in which the hoist cylinder 37 is extended at the first speed V1 and the second mode in which the extension of the hoist cylinder 37 is stopped. Note that the second speed V2 is not limited to zero and only required to be a speed slower than the first speed V1.

The hoist cylinder 37 extends at the first speed V1 during the first mode. Therefore, the inclination of the vessel 22 gradually increases and a cargo carried on the vessel 22 is discharged. The discharged cargo is supplied to the crusher CR. The extension of the hoist cylinder 37 is stopped during the second mode. Therefore, the discharge of the cargo carried on the vessel 22 is suppressed and the supply amount of the cargo to the crusher CR is suppressed. In the present embodiment, the first mode and the second mode are alternately repeated to raise the vessel 22, whereby it becomes possible to adjust the supply amount of the cargo to be supplied to the crusher CR.

Note that, as described above, the vessel control data is data used to adjust the supply amount of the cargo to be supplied to the crusher CR by alternately repeating the first mode and the second mode to extend the hoist cylinder 37 and raise the vessel 22. Therefore, the vessel control data management unit 111 generates the vessel control data based on, for example, the capacity and the processing speed of the crusher CR.

For example, when the capacity of the crusher CR is large, it is possible to increase the supply amount of the cargo to be supplied to the crusher CR at one time. Therefore, in this case, the period for the first mode in which the cargo is actively discharged from the vessel 22 is set to be long. On the other hand, when the capacity of the crusher CR is small, it is necessary to shrink the supply amount of the cargo to be supplied to the crusher CR at one time. Therefore, in this case, the period for the first mode is set to be short, that is, a start timing of the second mode is set to be earlier (refer to polygonal line L3 in FIG. 5).

In addition, when the processing speed of the crusher CR is high, a time until the completion of processing of the supplied cargo is shortened. In this case, the period for the second mode in which the supply amount of the cargo to the crusher CR is restricted is set to be short. On the other hand, when the processing speed of the crusher CR is low, a time until the completion of processing of the supplied cargo is elongated. In this case, the period for the second mode is set to be long, that is, an end timing of the second mode is set to be delayed (refer to polygonal line L4 in FIG. 5).

Meanwhile, depending on, for example, the weather and humidity at the dumping site DPA and the type of the cargo carried on the vessel 22, the amount of the cargo discharged while the vessel 22 is raised for a predetermined period in the first mode, that is, the supply amount of the cargo to be supplied to the crusher CR is sometimes different. For example, there is a case where more cargoes than an assumed amount are supplied to the crusher CR while the vessel 22 is raised for a predetermined period in the first mode. In such a case, if the second mode is performed only for a predetermined period set in advance, there is a possibility that the mode is switched to the first mode before the processing in the crusher CR is completed and a new cargo is supplied to the crusher CR. As a result, clogging can occur in the crusher CR and the processing can be congested.

Therefore, in the present embodiment, the changing unit 413 is capable of changing the timing of ending the second mode based on the detection result of the weight of the cargo detected by the pressure sensor 29. For example, if the weight of the cargo is smaller than a predetermined first reference amount after the first mode is performed, the changing unit 413 estimates that more cargoes than an assumed amount have been supplied to the crusher CR and delays the end timing of the second mode. Occurrence of clogging in the crusher CR can be suppressed by this processing.

Note that the changing unit 413 is also capable of advancing the timing of ending the second mode. For example, if the weight of the cargo is greater than a predetermined second reference amount after the first mode is performed, the changing unit 413 estimates that fewer cargoes than an assumed amount have been supplied to the crusher CR. When the supply amount of the cargo to be supplied to the crusher CR is smaller than the assumed amount, the crusher CR completes the processing in the middle of the second mode and thereafter, the crusher CR will wait until the end of the second mode while being empty. Therefore, in such a case, the changing unit 413 advances the end timing of the second mode. The waiting time of the crusher CR can be shortened by the above processing, whereby it is possible to suppress prolongation of the dumping work.

Note that the first reference amount and the second reference amount described above can be set in advance based on experiments, simulations, actual measurement results, and so on. In addition, the first reference amount and the second reference amount described above may use different values from each other. For example, the second reference amount may be a greater value than the first reference amount.

[Control Method]

Figure 6:
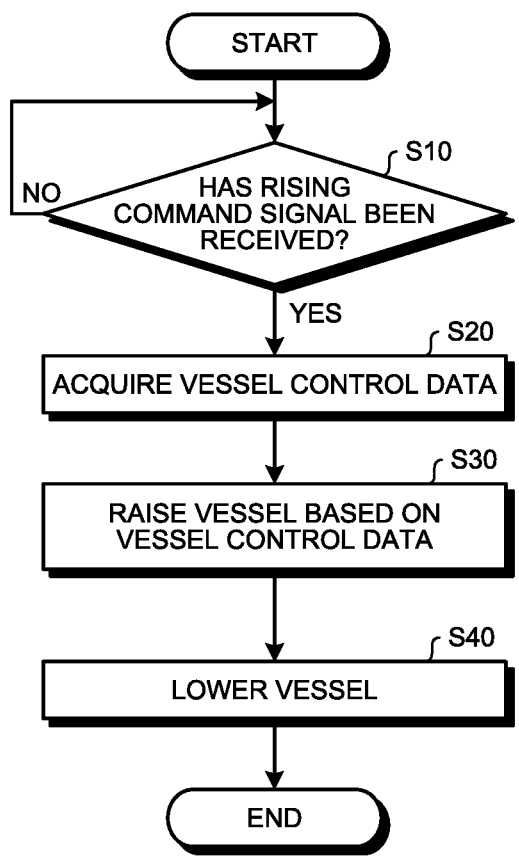
FIG. 6 is a flowchart illustrating an example of a control method for a dump truck according to the present embodiments.

Next, an example of a control method for the dump truck 2 according to the present embodiment will be described. FIG. 6 is a flowchart illustrating an example of the control method for the dump truck 2 according to the present embodiment. The control method for the dump truck 2 includes receiving the rising command signal to cause the dump truck 2 including the vessel 22 to start the rising action of the vessel 22 and, when the rising command signal is detected, alternately performing the first mode in which the extension speed of the hoist cylinder 37 is assigned to the first speed V1 and the second mode in which the extension speed of the hoist cylinder 37 is assigned to the second speed V2.

First, in the control device 40 of the dump truck 2, the signal reception unit 411 detects whether the rising command signal has been received (step S10). When the rising command signal has not been received (No in step S10), the signal reception unit 411 repeats the action in step S10 until the rising command signal is received.

When the signal reception unit 411 has received the rising command signal (Yes in step S10), the vessel control unit 412 acquires the vessel control data (step S20). In step S20, the vessel control unit 412 instructs, for example, the management device 10 to transmit the vessel control data and receives the vessel control data from the management device 10. When the vessel control data has been received, the vessel control unit 412 raises the vessel 22 based on the vessel control data (step S30). The action in step S30 will be described later.

After ending the rise of the vessel 22, the vessel control unit 412 lowers the vessel 22 to the reference position P1 (step S40). Thereafter, the arithmetic processing device 41 controls the driving device 31 and so on to start up the dump truck 2 and causes the dump truck 2 to travel from a dumping spot.

Figure 7:
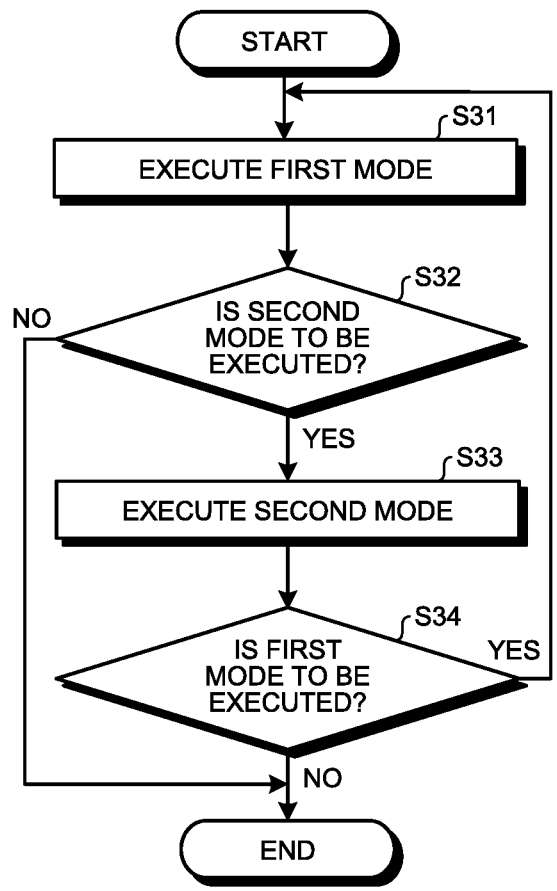
FIG. 7 is a flowchart illustrating in detail an action in step S30.

FIG. 7 is a flowchart illustrating in detail the action in step S30. In step S30, as illustrated in FIG. 7, the vessel control unit 412 first executes the first mode (step S31). In step S31, the hoist cylinder 37 extends at the first speed V1 and the cargo carried on the vessel 22 is discharged. The discharged cargo is supplied to the crusher CR.

The vessel control unit 412 ends the first mode at a timing set in the vessel control data (for example, t1, t3, t5, and t7 in FIG. 5) and judges whether to execute the second mode (step S32). When the vessel control unit 412 judges to execute the second mode in step S32 (Yes in step S32, t1, t3, and t5 in FIG. 5), the vessel control unit 412 executes the second mode (step S33). In step S33, the vessel 22 is stopped because the extension of the hoist cylinder 37 is stopped and the discharge of the cargo carried on the vessel 22 is suppressed, whereby the supply amount of the cargo to the crusher CR is suppressed.

The vessel control unit 412 ends the second mode at a timing set in the vessel control data (for example, t2, t4, and t6 in FIG. 5) and judges whether to execute the first mode (step S34). When the vessel control unit 412 judges to execute the first mode in step S34 (Yes in step S34, t1, t3, and t5 in FIG. 5), the vessel control unit 412 executes the first mode. In this case, the action in step S31 is repeated.

On the other hand, when the vessel control unit 412 judges not to execute the second mode in step S32 (No in step S32, t7 in FIG. 5) or judges not to execute the first mode in step S34 (No in step S34), the vessel control unit 412 ends the rise of the vessel 22.

Figure 8:
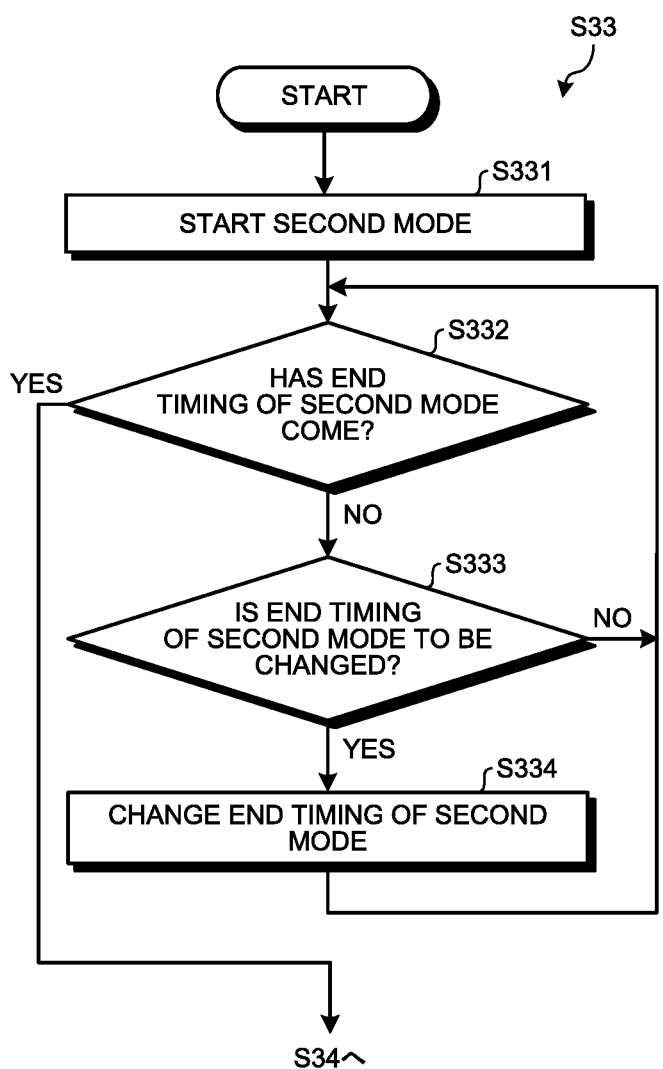
FIG. 8 is a flowchart illustrating an example of the action of a changing unit according to the present embodiments.

Note that, in the second mode (step S33) described above, the changing unit 413 may change the timing of ending the second mode based on the detection result of the weight of the cargo detected by the pressure sensor 29. FIG. 8 is a flowchart illustrating an example of the action of the changing unit 413 according to the present embodiment. As illustrated in FIG. 8, after the second mode is started (step S331), the changing unit 413 judges whether the end timing of the second mode has come (step S332). When the changing unit 413 judges that the end timing of the second mode has not come (No in step S332), the changing unit 413 judges whether to change the end timing of the second mode (step S333). In step S333, when the detection result by the pressure sensor 29 is, for example, smaller than the first reference amount or greater than the second reference amount, the changing unit 413 judges to change the end timing of the second mode (Yes in step S333). In this case, the changing unit 413 changes the end timing of the second mode (step S334). In step S334, when the detection result by the pressure sensor 29 is smaller than the first reference amount, for example, the changing unit 413 delays the end timing of the second mode. Meanwhile, when the detection result by the pressure sensor 29 is greater than the second reference amount, for example, the changing unit 413 makes the end timing of the second mode earlier. Thereafter, the changing unit 413 performs the processing in step S332 and the subsequent steps. On the other hand, when the detection result by the pressure sensor 29 is equal to or greater than the first reference amount and also is equal to or smaller than the second reference amount, for example, it is judged not to change the end timing of the second mode (No in step S333). In this case, the changing unit 413 performs the processing in step S332 and the subsequent steps without changing the end timing of the second mode.

Meanwhile, when the changing unit 413 judges, in step S332, that the end timing of the second mode has come, the changing unit 413 proceeds to step S34.

As described thus far, the control system 100 for the dump truck 2 according to the present embodiment includes the signal reception unit 411 that receives the rising command signal to cause the dump truck 2 including the vessel 22 and the hoist cylinder 37 configured to raise and lower the vessel 22 to start the rising action of the vessel 22 and the vessel control unit 412 that varies the extension speed of the hoist cylinder 37 nonlinearly with respect to the elapsed time when the signal reception unit 411 receives the rising command signal.

According to the present embodiment, by varying the extension speed of the hoist cylinder 37 nonlinearly with respect to the elapsed time, the supply amount of the cargo to be supplied to the crusher CR can be appropriately adjusted according to the capacity and the processing situation of the crusher CR and so on and thus, it is possible to smoothly perform the processing in the crusher CR. As a result, a decrease in productivity at a work site can be suppressed.

In addition, in the control system 100 for the dump truck 2 according to the present embodiment, the vessel control unit 412 performs the first mode in which the extension speed of the hoist cylinder 37 is assigned to the first speed V1 and the second mode in which the extension speed of the hoist cylinder 37 is assigned to the second speed V2 lower than the first speed V1, to raise the vessel 22. As a result, by alternately performing the first mode and the second mode, it becomes possible to appropriately adjust the supply amount of the cargo to be supplied to the crusher CR, whereby the processing in the crusher CR can be smoothly performed.

Furthermore, in the control system 100 for the dump truck 2 according to the present embodiment, the vessel control unit 412 alternately performs the first mode and the second mode such that the processing in the crusher CR can be performed more smoothly. For example, a plurality of unmanned dump trucks 2 and the like serve in a mine. Therefore, the amount of information communicated between the management device 10 and the plurality of dump trucks 2 and the like is enormous and thus, a communication load is increased. In contrast to this, by alternately performing the first mode in which the extension speed is constant at the first speed V1 and the second mode with the extension speed of zero, it is possible to perform the action of the vessel 22 with simple control of switching on and off, whereby the communication load can be reduced.

Additionally, in the control system 100 for the dump truck 2 according to the present embodiment, the second speed V2 is zero. As a result, the stationary state of the vessel 22 can be maintained during the second mode and thus, it becomes possible to reliably suppress the supply amount of the cargo to be supplied to the crusher CR, whereby the supply amount of the cargo can be adjusted with high accuracy.

In addition, in the control system 100 for the dump truck 2 according to the present embodiment, since the vessel control unit 412 performs the first mode and the second mode based on the vessel control data that defines the start and end timings of the first mode and the second mode, the supply amount of the cargo can be adjusted according to the crusher CR by generating the vessel control data based on, for example, the capacity and the processing speed of the crusher CR. As a result, the processing in the crusher CR can be smoothly performed and thus, it is possible to suppress a decrease in productivity at the work site.

Meanwhile, in the control system 100 for the dump truck 2 according to the present embodiment, the dump truck 2 has the pressure sensor 29 that detects the weight of the cargo carried on the vessel 22, while the changing unit 413 that changes at least one of a timing of starting the second mode and a timing of ending the second mode based on the detection result by the pressure sensor 29 when the second mode is started is further included. As a result, when the weight of the cargo is smaller than the predetermined first reference amount, it is estimated that more cargoes than the assumed amount have been supplied to the crusher CR and the end timing of the second mode is delayed. Consequently, occurrence of clogging in the crusher CR can be suppressed and thus, it is possible to suppress a decrease in productivity at the work site. Meanwhile, when the weight of the cargo is greater than the predetermined second reference amount, it is estimated that fewer cargoes than the assumed amount have been supplied to the crusher CR and the end timing of the second mode is advanced. The waiting time of the crusher CR can be shortened by such processing, whereby it is possible to suppress prolongation of the dumping work.

The technical scope of the present invention is not limited to the above-described embodiments and appropriate modifications can be made without departing from the spirit of the present invention. For example, in the above embodiments, a case where the control device 40 controls the rising action of the vessel 22 based on the vessel control data has been described as an example but the present invention is not limited thereto.

For example, the control device 40 may control the rising action of the vessel 22 based on a supply availability signal (dumping availability signal) from the crusher CR disposed at the dumping site DPA. The supply availability signal is a signal indicating whether a cargo can be supplied to the crusher CR. The supply availability signal includes a supply enable signal and a supply stop signal. The supply enable signal indicates that the crusher CR is in a processable state and a cargo can be supplied. The supply stop signal indicates that the supply of the cargo needs to be stopped, such as a state in which the crusher CR has not completed the processing or a state in which the crusher CR is malfunctioning.

For example, an operator of the crusher CR may manually input the supply availability signal through the input device 55 or the like. Alternatively, the inside of the crusher CR may be photographed by a photographing device such as a camera such that the control device 50 of the crusher CR detects the processing state of the crusher CR by image processing or the like based on a photographic result and the supply availability signal is selected and output based on a detection result. The supply availability signal can be transmitted by the control device 50 via the communication system 9.

Figure 9:
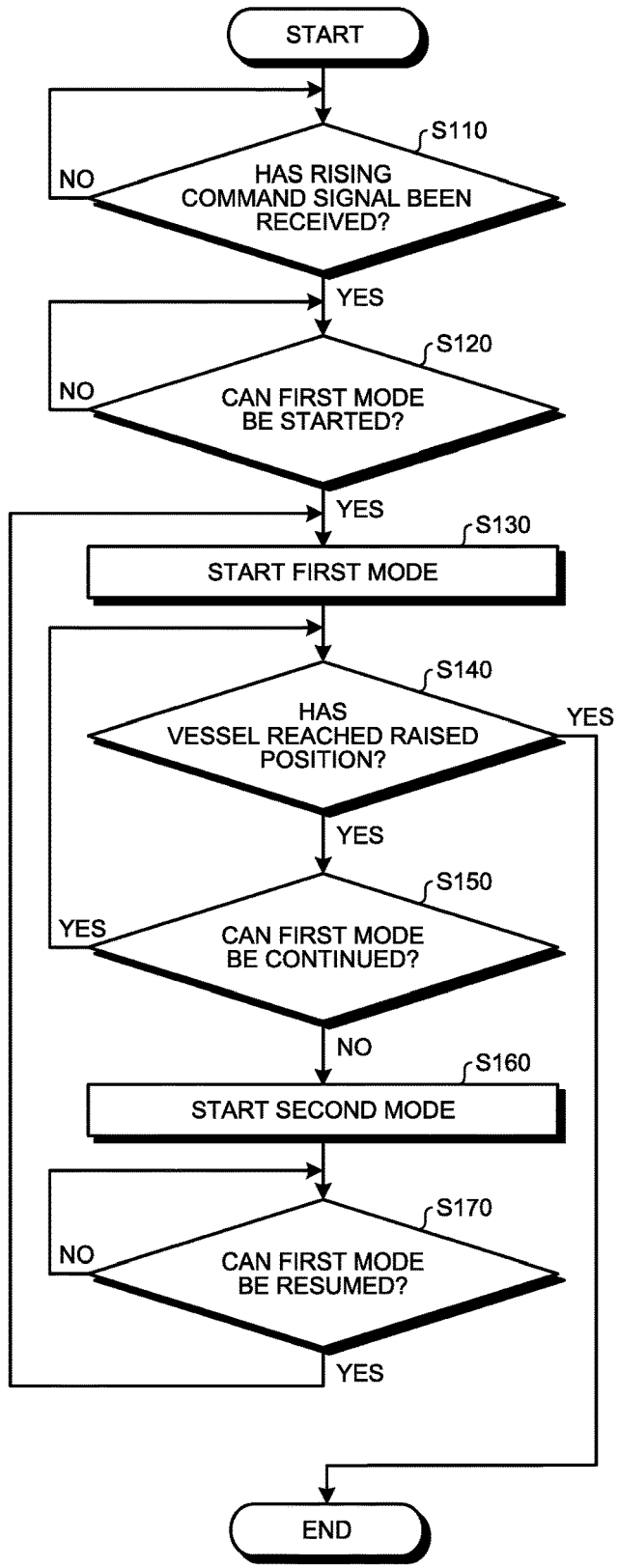
FIG. 9 is a flowchart illustrating another example of the control method for a dump truck according to the present embodiments.

FIG. 9 is a flowchart illustrating another example of the control method for the dump truck 2 according to the present embodiment. In the control device 40 of the dump truck 2, the signal reception unit 411 detects whether the rising command signal has been received (step S110). When the rising command signal has not been received (No in step S110), the signal reception unit 411 repeats the action in step S110 until the rising command signal is received.

When the signal reception unit 411 has received the rising command signal (Yes in step S110), the vessel control unit 412 acquires the supply availability signal from the crusher CR and judges whether the first mode can be started based on the acquired supply availability signal (step S120). In step S120, the vessel control unit 412 instructs, for example, the crusher CR to transmit the supply availability signal and receives the supply availability signal from the crusher CR.

When the received supply availability signal is the supply stop signal, the vessel control unit 412 determines that the first mode cannot be started (No in step S120). In this case, the vessel control unit 412 repeats the judgment in step S120. On the other hand, when the received supply availability signal is the supply enable signal, the vessel control unit 412 determines that the first mode can be started (Yes in step S120) and starts the first mode (step S130).

In the first mode, the hoist cylinder 37 extends at the first speed V1 and the vessel 22 rises according to the extension of the hoist cylinder 37 such that the cargo carried on the vessel 22 is discharged. The discharged cargo is supplied to the crusher CR. In the first mode, the vessel control unit 412 performs the following judgment while extending the hoist cylinder 37 at the first speed V1. That is, the vessel control unit 412 first judges whether the vessel 22 has reached the set raised position P2 (step S140). When the vessel control unit 412 judges that the vessel 22 has not reached the set raised position P2 (No in step S140), the vessel control unit 412 acquires the supply availability signal from the crusher CR and judges whether the first mode can be continued based on the acquired supply availability signal (step S150). When the received supply availability signal is the supply enable signal, the vessel control unit 412 judges that the first mode can be continued (Yes in step S150) and, in this case, the judgment in step S140 and the subsequent steps is repeated. Meanwhile, when the received supply availability signal is the supply stop signal, the vessel control unit 412 judges that the first mode cannot be continued (No in step S150) and starts the second mode (step S160).

The vessel 22 is stopped when the second mode started and the discharge of the cargo carried on the vessel 22 is suppressed, whereby the supply amount of the cargo to the crusher CR is suppressed. In the second mode, the vessel control unit 412 judges whether the first mode can be resumed while the extension speed of the hoist cylinder 37 is kept at the second speed V2 (step S170). In step S170, the vessel control unit 412 acquires the supply availability signal from the crusher CR and judges whether the first mode can be resumed based on the acquired supply availability signal. When the received supply availability signal is the supply enable signal, the vessel control unit 412 judges that the first mode can be resumed (Yes in step S170) and, in this case, the processing in step S130 and the subsequent steps is repeated. Meanwhile, when the received supply availability signal is the supply stop signal, the vessel control unit 412 judges that the first mode cannot be resumed (No in step S170) and the judgment in step S170 is repeated.

Note that, when the vessel control unit 412 judges, in step S140, that the vessel 22 has reached the set raised position P2 (Yes in step S140), the vessel control unit 412 ends rising control.

With the steps described thus far, in the control device 40 of the dump truck 2, the vessel control unit 412 performs the first mode and the second mode based on the supply availability signal generated according to the capacity and the processing situation of the crusher CR at the dumping site DPA and accordingly, it is possible to supply the cargo to the crusher CR or restrict the supply amount according to the capacity and the processing situation of the crusher CR. As a result, the supply amount of the cargo can be efficiently adjusted and thus, it is possible to suppress a decrease in productivity at the work site.

Figure 10:
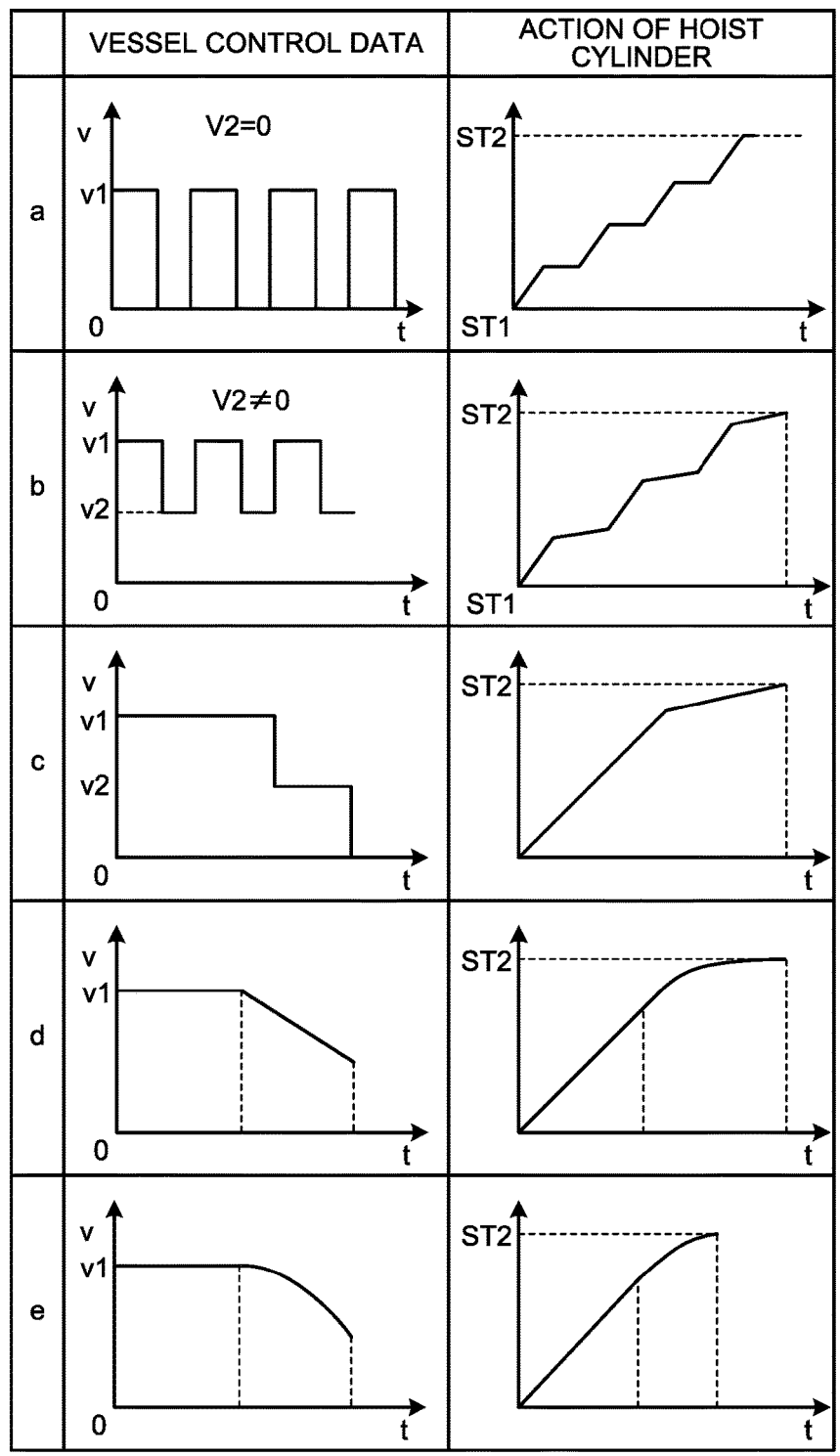
FIG. 10 is a diagram illustrating the vessel control data and the action of a hoist cylinder in correspondence with each other.

In addition, the extending action of the hoist cylinder 37 by the vessel control unit 412 is not limited to the modes of the above embodiments. FIG. 10 is a diagram illustrating the vessel control data and the action of the hoist cylinder 37 in correspondence with each other. For example, as illustrated in a row a in FIG. 10, a case where the first speed V1 is assigned to a constant value, while the second speed V2 is assigned to zero, and the first mode and the second mode are alternately performed has been described as an example in the above embodiments. However, the present invention is not limited thereto.

For example, as illustrated in a row b in FIG. 10, the second speed V2 in the second mode may not use zero but may be assigned to a value lower than the first speed V1 (constant value). In this case, the vessel control unit 412 simply controls a solenoid proportional valve such that the hoist valve 38 maintains a position (intermediate position) between the position of the first speed V1 (rising position) and the position of zero speed (neutral position).

In addition, for example, as illustrated in a row c in FIG. 10, the first mode and the second mode may not be alternately performed. In this case, for example, a mode of performing the first mode and the second mode once may be employed. Additionally, in this case, the second speed V2 in the second mode can be assigned to, for example, a constant value.

Meanwhile, for example, as illustrated in a row d in FIG. 10, the value of the second speed V2 may not use a constant value. In the row d in FIG. 10, a case where the second speed V2 decreases (decelerates) at a constant rate with the elapsed time is indicated as an example. Note that the second speed V2 may increase at a constant rate with the elapsed time. In this case, the vessel control unit 412 simply controls a solenoid proportional valve so as to fluctuate the intermediate position of the hoist valve 38.

Furthermore, for example, as illustrated in a row e in FIG. 10, the rate of decrease of the second speed V2 may not be constant. Likewise, when the second speed V2 increases, the rate of increase may not be constant. In this case, the vessel control unit 412 simply controls a solenoid proportional valve so as to fluctuate the intermediate position of the hoist valve 38.

In addition, in the above embodiments, a configuration in which the vessel control unit 412 is provided in the control device 40 of the dump truck 2 has been described as an example. However, the present invention is not limited thereto and the vessel control unit may be provided in the management device 10. In this case, the vessel control unit transmits the vessel driving signal from the management device 10 to the vessel rising and lowering driving device 30 of the dump truck 2 via the communication system 9.

REFERENCE SIGNS LIST

L1 POLYGONAL LINE
L2 STRAIGHT LINE
P1 REFERENCE POSITION
P2 RAISED POSITION
V1 FIRST SPEED
V2 SECOND SPEED
PA WORKPLACE
HL CONVEYING PATH
CR CRUSHER
AX ROTATION SHAFT
IS INTERSECTION
DPA DUMPING SITE
t0, t1, t2, t3, t4, t5, t6, t7 TIME

LPA LOADING GROUND
1 MANAGEMENT SYSTEM
2 WORK VEHICLE, DUMP TRUCK
2F FRONT PORTION
2R REAR PORTION
3 LOADING MACHINE
5 POSITIONING SATELLITE
6 REPEATER
7 CONTROL FACILITY
9 COMMUNICATION SYSTEM
10 MANAGEMENT DEVICE
11, 41, 51 ARITHMETIC PROCESSING DEVICE
12, 42, 52 STORAGE DEVICE
13, 43, 53 INPUT/OUTPUT INTERFACE
14, 44, 54 WIRELESS COMMUNICATION DEVICE
15, 55 INPUT DEVICE
16 OUTPUT DEVICE
21 VEHICLE BODY FRAME
22 VESSEL
23 TRAVELING DEVICE
24 TIRE
25 WHEEL
25F FRONT WHEEL
25R REAR WHEEL
26 REAR AXLE
27 AXLE
28 SUSPENSION CYLINDER
29 PRESSURE SENSOR
30 VESSEL RISING AND LOWERING DRIVING DEVICE
31 DRIVING DEVICE
32 BRAKING DEVICE
33 STEERING DEVICE
34 POSITION DETECTOR
35 DETECTION DEVICE
35A STEERING ANGLE SENSOR
35B AZIMUTH ANGLE SENSOR
37 HOIST CYLINDER
38 HOIST VALVE
39 HYDRAULIC PUMP
40, 50 CONTROL DEVICE
56 DISPLAY DEVICE
100 CONTROL SYSTEM FOR WORK VEHICLE
111 VESSEL CONTROL DATA MANAGEMENT UNIT
411 SIGNAL RECEPTION UNIT
412 VESSEL CONTROL UNIT
413 CHANGING UNIT
511 JUDGMENT UNIT
512 SIGNAL OUTPUT CONTROL UNIT

The invention claimed is:

1. A control system for a dump truck comprising:
a signal reception unit configured to receive a rising command signal to cause the dump truck including a vessel and a hydraulic cylinder configured to raise and lower the vessel to start a rising action of the vessel; and
a vessel control unit configured to change an extension speed of the hydraulic cylinder so as to raise the vessel in stages with respect to elapsed time when the signal reception unit receives the rising command signal.

2. The control system for the dump truck according to claim 1, wherein the vessel control unit performs a first mode in which the extension speed of the vessel by the hydraulic cylinder is assigned to a first speed and a second mode in which the extension speed is assigned to a second speed lower than the first speed, to raise the vessel.

3. The control system for the dump truck according to claim 2, wherein the vessel control unit alternately performs the first mode and the second mode to raise the vessel.

4. The control system for the dump truck according to claim 2, wherein the second speed is zero.

5. The control system for the dump truck according to claim 2, wherein the vessel control unit performs the first mode and the second mode based on vessel control data that defines start and end timings of each of the first mode and the second mode.

6. The control system for the dump truck according to claim 5, wherein
the dump truck has a weight detection unit that detects a weight of a cargo carried on the vessel,
the control system further comprising a changing unit that changes at least one of a timing of starting the second mode and a timing of ending the second mode based on a detection result by the weight detection unit.

7. The control system for the dump truck according to claim 2, wherein the vessel control unit performs the first mode and the second mode based on a dumping availability signal generated according to a capacity and a dumping situation of a dumping site.

8. A dump truck comprising the control system for the dump truck according to claim 1.

9. A control method for a dump truck comprising:
receiving a rising command signal to cause the dump truck including a vessel and a hydraulic cylinder configured to raise and lower the vessel to start a rising action of the vessel; and
changing an extension speed of the hydraulic cylinder so as to raise the vessel in stages with respect to elapsed time when the rising command signal is received.

* * * * *